C. SEITZ.
CLUTCH MECHANISM.
APPLICATION FILED APR. 11, 1911.
1,016,647.
Patented Feb. 6, 1912.
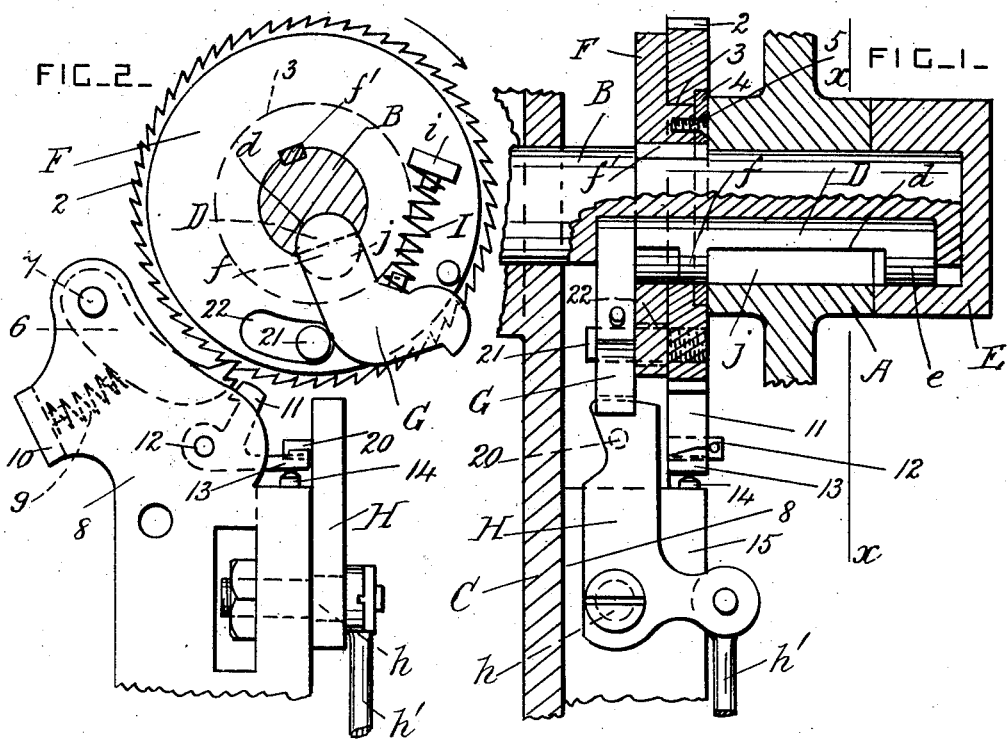

UNITED STATES PATENT OFFICE.

CHARLES SEITZ, OF ALBANY, NEW YORK.

CLUTCH MECHANISM.

1,016,647. Specification of Letters Patent. Patented Feb. 6, 1912.

Application filed April 11, 1911. Serial No. 620,508.

*To all whom it may concern:*

Be it known that I, CHARLES SEITZ, a citizen of the United States, residing at Albany, in the county of Albany and State of New York, have invented certain new and useful Improvements in Clutch Mechanism; and I do hereby declare the following to be a full, clear, and exact description of the invention, such as will enable others skilled in the art to which it appertains to make and use the same.

This invention relates to clutch mechanism more particularly intended for use in connection with power presses and other similar machines; and it consists in the novel construction and combination of the parts hereinafter fully described and claimed whereby the revolving driven member may be stopped or unclutched at will at any point of its revolution.

In the drawings, Figure 1 is a side view of the clutch mechanism constructed according to this invention, showing portions of it in section. Fig. 2 is an end view, looking from the left in Fig. 1, and showing the stop-wheel engaged by the stop-pawl. Fig. 3 is an end view, looking from the right in Fig. 1, and showing the stop-wheel disengaged from the stop-pawl. Fig. 4 is a cross-section taken on the line $x$—$x$ in Fig. 1.

A is the driving member which is usually the hub of a fly-wheel.

B is the driven member which is usually a shaft upon which the said hub is mounted. This shaft is journaled in any suitable frame or support C.

D is a clutch-key for connecting the driving and driven members, as described and shown in the patent of C. E. Pollard, No. 752,100, dated Feb. 16, 1904. In the form of the device shown in this patent the driving and driven members, after being connected by the clutch-key, cannot be disconnected at will until they have made a revolution, but when provided with auxiliary tripping devices as hereinafter described they can be disconnected at any point of the revolution. As described in the said patent, the clutch-key D is seated in a recess $d$ in the shaft and is provided with cylindrical bearings $e$ and $f$ at its ends. One of these bearings $e$ is journaled in a collar E secured to the shaft at one end of the wheel hub A, and the other bearing $f$ is journaled in a plate or disk F secured to the shaft by a key $f'$ at the other end of the wheel hub.

G is an arm for oscillating the key D. This arm is operatively connected with the key in any approved manner, and it may be formed integral with the key, or separate from it as described in the said patent.

H is a stop pivoted to the frame C by a pin $h$, and normally arranged in engagement with the arm G as shown in Fig. 1, so that the clutch-key is held wholly in the recess $d$, and the wheel hub A is revolved without revolving the shaft. A rod $h'$ and a suitable treadle are provided for operating the stop H at will, and when the stop is moved to the right in Fig. 1, out of engagement with the arm G, a spring I arranged between the said arm and a lug $i$ on the plate F turns the arm and the clutch-key and moves one portion of the clutch-key into engagement with a groove $j$ in the wheel-hub A. When constructed as described in the said patent, the driving and driven members A and B are uncoupled when the shaft B has made one or more revolutions, by the arm G striking the stop, which is replaced in its path.

According to the present invention, a ratchet toothed stop-wheel 2 is journaled concentric with the shaft or driven member B. This stop-wheel 2 may have any form of teeth on or grooves in its periphery, and such teeth or grooves may extend wholly or only partially around it. The stop-wheel 2 may be mounted in any convenient way, and it is preferably journaled on a hub 3 formed on one side of the plate F, and is retained thereon by a ring plate 4 which is secured to the hub 3 by a screw 5. A stop-pawl 6 is pivoted by a pin 7 to a bracket 8, secured to the frame or support C, and 9 is a spring, arranged between the pawl 6 and a lug 10 on the bracket, for forcing the stop-pawl into engagement with the stop-wheel. A catch 11 is pivoted by a pin 12 to the bracket 8, and is provided with an arm 13. A spring-pressed pin 14 is carried by a guide 15 on the bracket 8, and this pin normally holds the arm 13 in its raised position, and thereby holds the catch in engagement with the pawl 6, which has previously been retracted out of engagement with the stop-wheel, as shown in Fig. 3. A lever 16 is pivoted to the bracket 8 by a pin 17, and is connected to the stop-pawl 6 by a pivoted link 18. This lever affords a means for retracting the stop-pawl against the pressure of its spring, but any other approved device can be used for that purpose, or the stop-pawl may be retracted by hand. The pivoted stop H is provided with a laterally projecting pin 20, and the free end portion of the arm 13 is arranged in the path of this pin. A stop-pin 21 is secured to the stop-wheel 2, and is arranged to project through a curved slot 22 or other opening in the plate F, so that it may engage with the arm G on the end of the clutch-key.

The clutch-key is operated to couple the driving member to the driven member by moving the stop H to the right in Fig. 1 until it is out of engagement with the arm G and ready to engage with the arm 13. In order to uncouple the driven member, and stop the press at any point of any revolution, the stop H is moved by the rod $h'$ farther to the right in Fig. 1, so that it depresses the arm 13 and disengages the stop-pawl from the catch 11. The stop-pawl 6 is pressed by its spring into engagement with the stop-wheel and arrests its motion, so that the arm G on the clutch-key comes in contact with the stop-pin 21 which is held stationary. The arm and the clutch-key are actuated by contact with the stop-pin, and the clutch-key is turned out of engagement with the groove $j$ in the wheel hub A, thereby disengaging the shaft B so that it ceases to revolve.

The curved slot 22 is made of such a length that the stop-pin is retained in convenient proximity to the arm G, and so that the stop-wheel 2 may have a limited movement independent of the plate F although it normally revolves with it and the driven member.

As the press can be stopped quickly at any point of the revolution of the shaft B, many accidents can be prevented which would otherwise occur, and which would result in injury to the operator or to the press mechanism or dies.

What I claim is:

1. In a clutch mechanism, the combination, with a driving member, a driven member, and an oscillatory clutch-key provided with a spring-pressed operating arm and adapted to connect the said members; of a pivoted stop normally engaging with the said arm and adapted to be moved to release it and to arrest it at the same point of the revolution of the driven member, and auxiliary stop mechanism operatively connected with the said driven member and adapted to be operated at will to actuate the said arm and thereby disconnect the said members at intermediate points of the revolution of the driven member.

2. In a clutch mechanism, the combination, with a driving member, a driven member, and an oscillatory clutch-key provided with a spring-pressed operating arm and adapted to connect the said members; of a pivoted stop normally engaging with the said arm and adapted to be moved to release it and to arrest it at the same point of the revolution of the driven member, a stop-wheel normally revolving with the driven member and provided with a projection for actuating the said arm, a spring-pressed stop-pawl for arresting the motion of the stop-wheel, and means for normally holding the said stop-pawl out of engagement with the stop-wheel.

3. In a clutch mechanism, the combination, with a driving member, a driven member, and an oscillatory clutch-key provided with a spring-pressed operating arm and adapted to connect the said members; of a pivoted stop which normally engages with the said arm, a stop-wheel normally revolving with the driven member and provided with a projection for actuating the said arm, a spring-pressed stop-pawl for arresting the motion of the stop-wheel, and a catch for holding the stop-pawl out of engagement with the stop-wheel, said catch being adapted to be operated by the pivoted stop after said stop has been moved to release the said arm.

4. The combination, with a driving member, a driven member, and an oscillatory clutch-key provided with a spring-pressed operating arm and adapted to connect the said members; of a plate secured to the driven member and provided with a slot, a stop-wheel mounted concentric with the said plate and provided with a stop-pin which works in the said slot and which is adapted to actuate the said arm, a spring-pressed stop-pawl for arresting the motion of the stop-wheel, and means for normally holding the said stop-pawl out of engagement with the stop-wheel.

5. In a clutch mechanism, the combination, with a driving member, a driven member, and an oscillatory clutch-key provided with a spring-pressed operating arm and adapted to connect the said members; of a stop-wheel normally revolving with the driven member and provided with a projection for actuating the said arm, a spring-pressed stop-pawl for arresting the motion of the stop-wheel, a spring-actuated retaining-catch for holding the stop-pawl out of engagement with the stop-wheel, and means for retracting the said stop-pawl out of engagement with the stop-wheel and into engagement with the said catch.

6. In a clutch mechanism, the combination, with a driving member, a driven member, and an oscillatory clutch-key provided with a spring-pressed operating arm and adapted to connect the said members; of a pivoted stop which normally engages with the said arm, a stop-wheel normally revolving with the driven member and provided with a projection for actuating the said arm, a spring-pressed stop-pawl for arresting the motion of the stop-wheel, a pivoted retaining-catch for engaging with the stop-pawl, said catch being provided with a projecting arm, a spring for causing the catch to engage with the stop-pawl when the stop-pawl is retracted, and a pin projecting from the said pivoted stop and adapted to release the stop-pawl from the retaining-catch by contact with its said arm after the said pivoted catch has been moved to release the operating arm of the clutch-key.

In testimony whereof I have affixed my signature in the presence of two witnesses.

CHARLES SEITZ.

Witnesses:
 HIRAM WALK,
 FREDERICK SEITZ.

Copies of this patent may be obtained for five cents each, by addressing the "Commissioner of Patents, Washington, D. C."